US005537877A

United States Patent [19]

Hsu

[11] Patent Number: 5,537,877

[45] Date of Patent: Jul. 23, 1996

[54] TORSION WRENCH WITH DISPLAY UNIT FOR DISPLAYING TORSION FORCE LIMIT THEREON

[76] Inventor: Frank Hsu, No. 122, I-Tung Rd., Chien-kuo Tsun, Tai-Ping Hsiang, Taichung Hsien, Taiwan

[21] Appl. No.: 531,135

[22] Filed: Sep. 20, 1995

[51] Int. Cl.$^{6}$ .......... G01L 5/24

[52] U.S. Cl. .......... 73/862.23; 81/479

[58] Field of Search .......... 73/862.191, 862.21, 73/862.22, 862.23, 862.24, 862.25; 33/832, 838; 81/479

[56] References Cited

U.S. PATENT DOCUMENTS

| | | | |
|---|---|---|---|
| 2,300,652 | 11/1942 | Cooney | 73/862.21 |
| 4,664,001 | 5/1987 | Denman | 81/479 |
| 4,765,064 | 8/1988 | Maeda | 33/832 |
| 5,435,190 | 7/1995 | Jansson et al. | 73/862.23 |

FOREIGN PATENT DOCUMENTS

| | | | |
|---|---|---|---|
| 767366 | 1/1957 | United Kingdom | 73/862.21 |

*Primary Examiner*—Richard Chilcot

*Assistant Examiner*—Ronald L. Biegel

*Attorney, Agent, or Firm*—Christensen O'Connor Johnson & Kindness

[57] ABSTRACT

A torsion wrench includes a tubular casing, a drive unit pivoted to the casing and adapted to engage a workpiece, a knocker for generating an alarm sound when torsion force that is applied by the drive unit on the workpiece reaches a predetermined torsion force limit, a biasing unit for biasing the knocker toward the drive unit, and an adjusting unit for adjusting initial biasing force of the biasing unit. The biasing unit includes a push piece and a spring disposed between the push piece and the knocker. The adjusting unit includes a tubular handle member which has a connecting end sleeved rotatably on one end of the casing, and a push rod unit having a first end portion extending into the handle member and a second end portion extending into the casing and connected to the push piece. Rotation of the handle member results in axial movement of the push rod unit in the casing. A torsion force detecting unit includes a sensor unit for generating an electrical signal corresponding to position of the push piece in the casing, a converter circuit for converting the electrical signal into a digital reading of the predetermined torsion force limit, and a display unit for displaying the digital reading thereon.

4 Claims, 6 Drawing Sheets

TORSION WRENCH WITH DISPLAY UNIT FOR DISPLAYING TORSION FORCE LIMIT THEREON

BACKGROUND OF THE INVENTION

1. Field of the Invention

The invention relates to a torsion wrench, more particularly to a torsion wrench with a display unit for displaying the torsion force limit thereon.

2. Description of the Related Art

When manipulating a torsion wrench to tighten or loosen a workpiece, the operator easily overtightens or fails to tighten sufficiently the workpiece because an improper torsion force was applied on the workpiece. In order to overcome this drawback, there is a conventional torsion wrench which can be adjusted so as to generate an alarm sound when a predetermined torsion force limit is reached. The conventional torsion wrench 10, as shown in FIG. 1, includes a tubular casing 11, a drive unit 13, a knocker 15, a biasing member 16, and an adjusting unit 14. The drive unit 13 has a head portion 130 that is adapted to engage a workpiece (not shown), and a shaft portion 131 that extends into the casing 11 and that is mounted pivotally to a first end of the casing 11 by means of a pin 12. The knocker 15 is disposed in the casing 11 and is connected to a distal end of the shaft portion 131. The knocker 15 knocks on the casing 11 so as to generate an alarm sound when the torsion force that is applied by the drive unit 13 on the workpiece reaches a predetermined torsion force limit. The biasing member 16 is disposed in the casing 11 and biases the knocker 15 toward the shaft portion 131 to prevent the knocker 15 from knocking on the casing 11 when the torsion force that is applied by the drive unit 13 has not yet reached the predetermined torsion force limit. The adjusting unit 14 is used to adjust an initial biasing force that is applied by the biasing member 16 on the knocker 15 so as to correspond with the predetermined torsion force limit. The adjusting unit 14 includes a push rod 142 mounted movably in the casing 11 and abutting against the biasing member 16, a tubular handle member 141 sleeved rotatably on a second end of the casing 11 and connected operably to the push rod 142, and a locking unit 144 for locking the handle member 141.

In use, the handle member 141 is rotated to cause axial movement of the push rod 142 in the casing 11 so as to adjust the initial biasing force of the biasing member 16 to correspond with the predetermined torsion force limit. The locking unit 144 is then operated to lock the handle member 141 in order to maintain the initial biasing force at an amount corresponding to the predetermined torsion force limit. When the torsion force that is applied by the drive unit 13 on a workpiece reaches the predetermined torsion force limit, the knocker 15 separates from the distal end of the shaft portion 131 to knock on the casing 11, thereby generating an alarm sound.

When setting the torsion force limit in the conventional torsion wrench 10, the handle member 141 is rotated so that graduations on the handle member 141 are aligned with corresponding graduations on the casing 11. Since the graduations are very small, setting and reading of the torsion force limit in the conventional torsion wrench 10 is inconvenient to conduct.

SUMMARY OF THE INVENTION

Therefore, the object of the present invention is to provide a torsion wrench with a display unit for displaying the torsion force limit thereon to facilitate setting and reading of the torsion force limit.

Accordingly, the torsion wrench of the present invention is to be used in tightening or loosening a workpiece and includes:

a tubular casing having first and second ends;

a drive unit having a head portion which is adapted to engage the workpiece, and a shaft portion which extends into the casing via the first end and which is mounted pivotally to the casing at the first end;

a knocker disposed in the casing and connected to a distal end of the shaft portion, the knocker knocking on the casing so as to generate an alarm sound when torsion force that is applied by the drive unit on the workpiece reaches a predetermined torsion force limit;

a biasing unit which is disposed in the casing and which biases the knocker toward the shaft portion to prevent the knocker from knocking on the casing when the torsion force that is applied by the drive unit has not yet reached the predetermined torsion force limit, the biasing unit including a push piece movable axially in the casing, and a spring disposed between the push piece and the knocker;

an adjusting unit for adjusting initial biasing force of the biasing unit so as to correspond with the predetermined torsion force limit, the adjusting unit including a tubular handle member which has a connecting end sleeved rotatably on the second end of the casing, and a push rod unit having a first end portion extending into the handle member and a second end portion extending into the casing and connected to the push piece, the first and second end portions of the push rod unit being connected operably and respectively to the handle member and the casing such that rotation of the handle member results in axial movement of the push rod unit in the casing; and a torsion force detecting unit which includes: a housing mounted on the casing; a sensor unit mounted on the housing, the sensor unit generating an electrical signal corresponding to position of the push piece in the casing; a converter circuit mounted on the housing and connected electrically to the sensor unit, the converter circuit converting the electrical signal into a digital reading of the predetermined torsion force limit; and a display unit mounted on the housing and connected electrically to the converter circuit, the display unit displaying the digital reading thereon.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
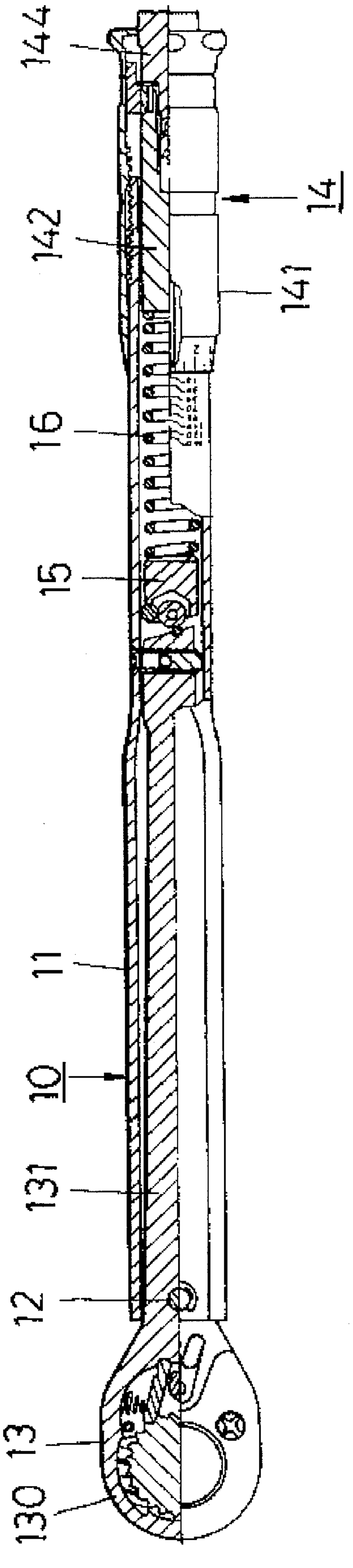
FIG. 1 PRIOR ART
FIG. 1 is a schematic, partly sectional view showing a conventional torsion wrench.
Figure 2:
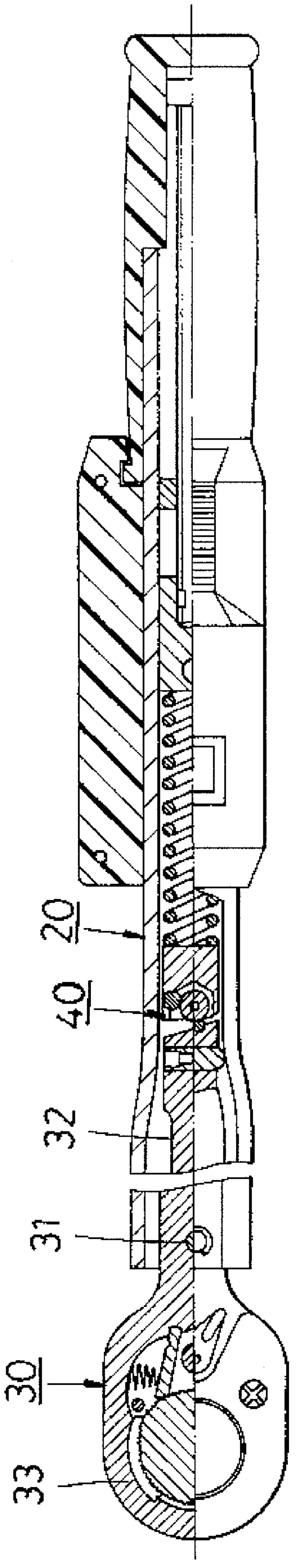
FIG. 2 is a schematic, partly sectional view of the preferred embodiment of a torsion wrench according to the present invention.
Figure 3:
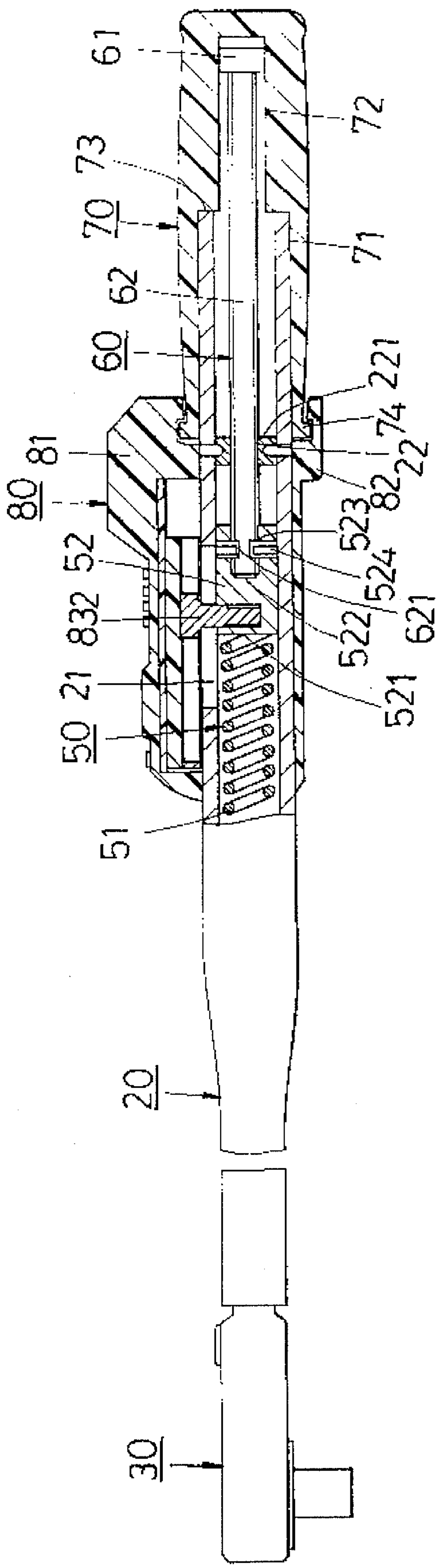
FIG. 3 is another schematic, partly sectional view of the preferred embodiment.

Referring to FIGS. 2 and 3, the preferred embodiment of a torsion wrench according to the present invention is shown to comprise a tubular casing 20, a drive unit 30, a knocker 40, a biasing unit 50, an adjusting unit which includes a push rod unit 60 and a tubular handle member 70, and a torsion force detecting unit 80.

The drive unit 30 has a head portion 33 that is adapted to engage a workpiece (not shown), and a shaft portion 32 that extends into a first end of the casing 20 and that is mounted pivotally to the casing 20 by means of a pin 31. The knocker 40 is disposed in the casing 20 and is connected to a distal end of the shaft portion 32. The knocker 40 knocks on the casing 20 so as to generate an alarm sound when the torsion force that is applied by the drive unit 30 on the workpiece reaches a predetermined torsion force limit. The casing 20 is formed with an axially extending slot 21 and has a nut 22 mounted therein. The nut 22 is formed with an internal thread 221.

The biasing unit 50 is disposed in the casing 20 and includes a spring 51 and a push piece 52. The spring 51 is disposed between the push piece 52 and the knocker 40 and serves to bias the knocker 40 toward the shaft portion 32 to prevent the knocker 40 from knocking on the casing 20 when the torsion force that is applied by the drive unit 30 has not yet reached the predetermined torsion force limit. The push piece 52 is movable axially in the casing 20 and is disposed adjacent to the slot 21. The push piece 52 is formed with a radial hole 521 and an axial insert hole 522.

The push rod unit 60 includes an externally threaded rod 62 and a hexagonal nut 61 mounted on a first end portion of the threaded rod 62. The threaded rod 62 has a second end portion which extends into the casing 20 and engages threadedly the internal thread 221 of the nut 22. The second end portion of the threaded rod 62 is formed with an annular groove 621 and extends into the insert hole 522 of the push piece 52. The push piece 52 is further formed with a pair of radial screw holes 523 that are aligned with the annular groove 621. A pair of positioning screws 524 engage the screw holes 523 and extend into the annular groove 621 to connect rotatably the second end portion of the threaded rod 62 to the push piece 52.

The tubular handle member 70 is formed as a hollow cylindrical tube which confines a blind hole that has a wider outer portion 71 and a narrower inner portion 72. A shoulder 73 is formed between the outer and inner portions 71, 72. The outer portion 71 is a circular portion and receives fittingly and slidably the second end of the casing 20 opposite to the drive unit 30. The inner portion 72 is a hexagonal portion that receives slidably and non-rotatably the hexagonal nut 61 on the first end portion of the threaded rod 62. Thus, when the handle member 70 is rotated relative to the casing 20, the push rod unit 60 rotates with the handle member 70, thereby causing the threaded rod 62 to extend further into or retract from the casing 20 to adjust an initial biasing force that is applied by the biasing unit 50 on the knocker 40 so as to correspond with the predetermined torsion force limit. The handle member 70 further has a connecting end formed with an annular flange 74 that projects radially outward and that has a periphery formed with first teeth 75, as shown in FIG. 4.

Figure 4:
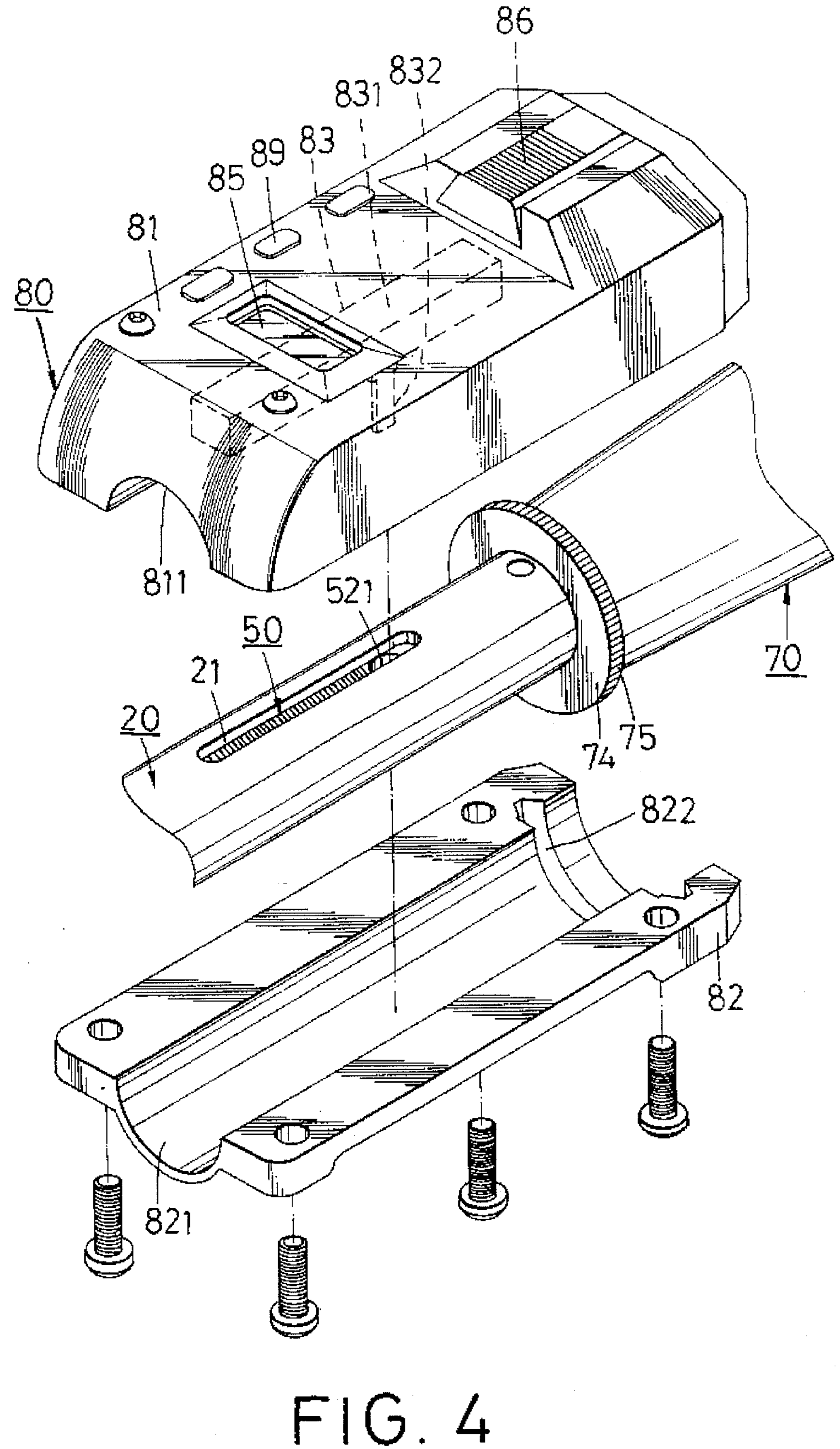
FIG. 4 is an exploded view illustrating a torsion force detecting unit of the preferred embodiment.
Figure 5:
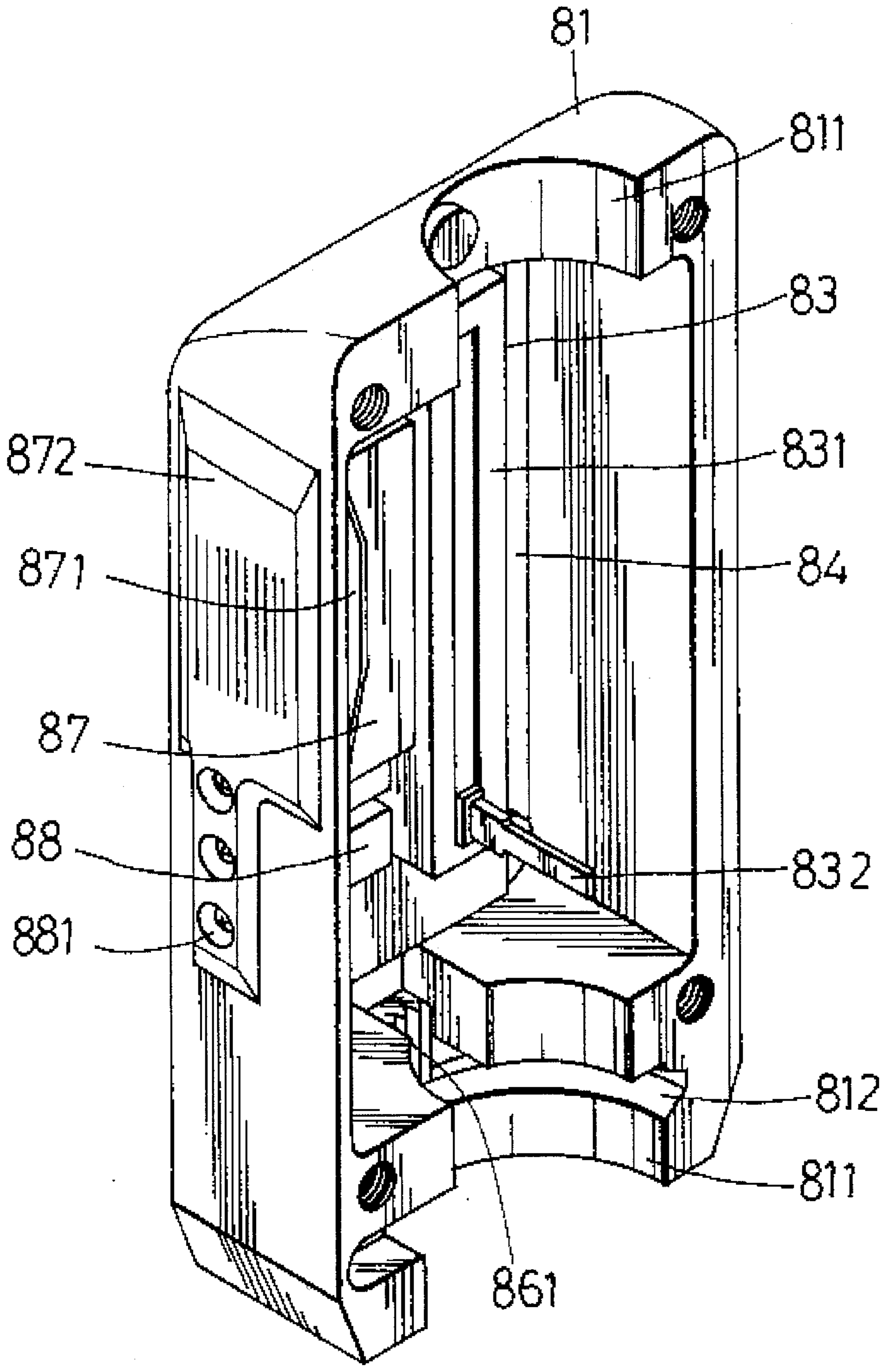
FIG. 5 is a rear perspective view of a first housing part of the torsion force detecting unit of the preferred embodiment.
Figure 6:
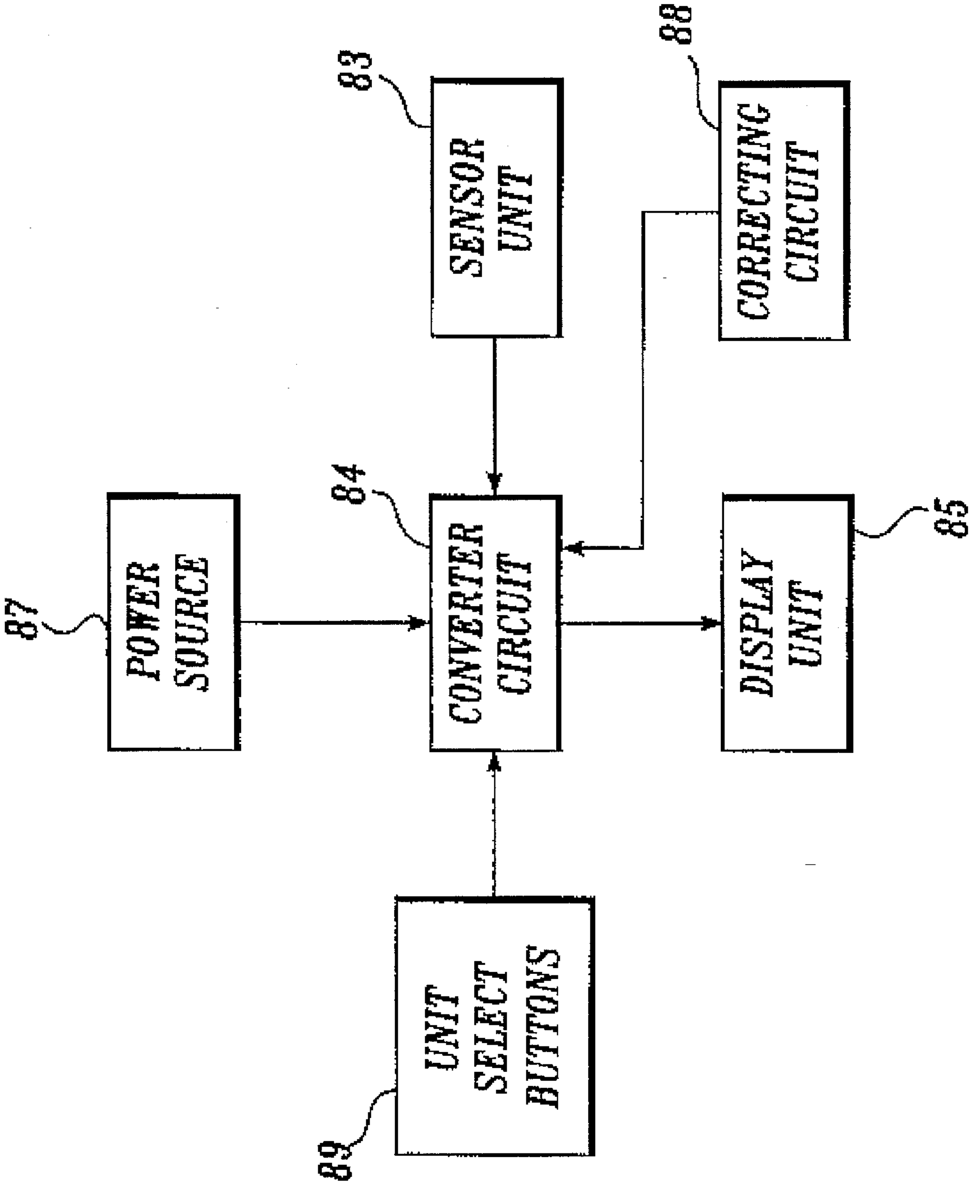
FIG. 6 is a schematic circuit block diagram of the torsion force detecting unit of the preferred embodiment.

Referring to FIGS. 4 and 5, the torsion force detecting unit 80 includes a housing constituted by complementary first and second housing parts 81, 82. A sensor unit 83, a converter circuit 84, a display unit 85, a switch actuator 86, a power source 87, a correcting circuit 88 and a number of unit select buttons 89 are mounted on the first housing part 81. As shown in FIG. 6, the sensor unit 83, the display unit 85, the power source 87, the correcting circuit 88 and the unit select buttons 89 are connected electrically to the converter circuit 84.

The first housing part 81 has opposite ends formed with a curved recess 811. The first housing part 81 further has an inner side formed with a curved groove 812 adjacent to one of the recesses 811. The second housing part 82 has an inner side formed with a longitudinally extending curved recess 821 and a curved groove 822 aligned with the curved groove 812 in the first housing part 81. The first housing part 81 is further provided with a detachable cover 872 to facilitate replacement of a battery unit 871 of the power source 87, and has a knob 881 of the correcting circuit 88 mounted rotatably thereon for adjustment purposes.

The sensor unit 83 detects the position of the push piece 52 in the casing 20. In this embodiment, the sensor unit 83 includes a variable resistor 831 with a slider 832 that extends through the slot 21 in the casing 20 and into the radial hole 521 in the push piece 52. Thus, movement of the push piece 52 in the casing 20 will result in movement of the slider 832 to vary accordingly resistance of the variable resistor 831.

When the torsion force detecting unit 80 is assembled, the first and second housing parts 81, 82 are interconnected and are disposed on opposite sides of the casing 20 such that the casing 20 extends through the recesses 811, 821 in the housing parts 81, 82. The slider 832 of the variable resistor 831 extends into the radial hole 521 in the push piece 52, while the connecting end of the handle member 70 extends into the housing such that the flange 74 extends into the curved grooves 812, 822 of the housing parts 81, 82. The switch actuator 86 is mounted movably on the first housing part 81 and is operated to activate the power source 87. The switch actuator 86 has an inner side formed with second teeth 861, and is movable between a first position, wherein the second teeth 861 engage the first teeth 75 on the flange 74 to arrest rotation of the handle member 70 relative to the first and second housing parts 81, 82, and a second position, wherein the second teeth 861 disengage the first teeth 75 to permit rotation of the handle member 70.

Referring once more to FIGS. 2 and 3, when setting the torsion force limit, the switch actuator 86 is moved to the second position to permit rotation of the handle member 70. Rotation of the handle member 70 causes the push rod unit 60 to rotate therewith, thereby moving the threaded rod 62 axially to move correspondingly the push piece 52 in the casing 20 and adjust the initial biasing force that is applied by the spring 51 on the knocker 40 so as to correspond with the predetermined torsion force limit. Movement of the push piece 52 in the casing 20 results in movement of the slider 832 to vary accordingly resistance of the variable resistor 831. Since the power source 87 is activated when the switch actuator 86 is moved to the second position, the resistance value of the sensor unit 83 can be measured by the converter circuit 84, and the measured resistance value is converted into a digital reading of the torsion force limit for display on the display unit 85, thereby facilitating setting and reading of the torsion force limit.

After the torsion force limit has been set, the switch actuator 86 is moved back to the first position so that the second teeth 861 on the switch actuator 86 engage the first teeth 75 on the flange 74 to arrest rotation of the handle member 70 relative to the first and second housing parts 81, 82. Thus, accidental rotation of the handle member 70, which causes variations in the initial biasing force of the spring 51, is prevented to avoid undesired changes in the torsion force limit.

The operation of the preferred embodiment when used to drive a workpiece, such as a nut, is similar to that of the conventional torsion wrench described beforehand. That is, when the torsion force that is applied by the drive unit 30 on the workpiece reaches a predetermined torsion force limit, the knocker 40 knocks on the casing 20 so as to generate an alarm sound to warn the operator.

The unit select buttons 89 are operated to control the converter circuit 84 to provide the torsion force limit in terms of a selected standard unit, such as that used in the Metric system or the English system. Thus, there is no need for the operator to perform a conversion step to determine the torsion force limit in a desired standard unit.

In addition, the knob 881 of the correcting circuit 88 is operable so as to control the converter circuit 84 to provide compensation for spring fatigue after long term use of the biasing unit 50.

While the present invention has been described in connection with what is considered the most practical and preferred embodiment, it-is understood that this invention is not limited to the disclosed embodiment, but is intended to cover various arrangements included within the spirit and scope of the broadest interpretation so as to encompass all such modifications and equivalent arrangements.

I claim:

1. A torsion wrench for tightening or loosening a workpiece, said torsion wrench including a tubular casing having first and second ends, a drive unit having a head portion which is adapted to engage the workpiece, and a shaft portion which extends into said casing via said first end and which is mounted pivotally to said casing at said first end, a knocker disposed in said casing and connected to a distal end of said shaft portion, said knocker knocking on said casing so as to generate an alarm sound when torsion force that is applied by said drive unit on the workpiece reaches a predetermined torsion force limit, a biasing unit which is disposed in said casing and which biases said knocker toward said shaft portion to prevent said knocker from knocking on said casing when the torsion force that is applied by said drive unit has not yet reached the predetermined torsion force limit, and an adjusting unit for adjusting initial biasing force of said biasing unit so as to correspond with the predetermined torsion force limit, wherein:

said biasing unit includes a push piece movable axially in said casing, and a spring disposed between said push piece and said knocker;

said adjusting unit includes a tubular handle member which has a connecting end sleeved rotatably on said second end of said casing; and a push rod unit having a first end portion extending into said handle member and a second end portion extending into said casing and connected to said push piece, said first and second end portions of said push rod unit being connected operably and respectively to said handle member and said casing such that rotation of said handle member results in axial movement of said push rod unit in said casing; and said torsion wrench further comprises a torsion force detecting unit which includes: a housing mounted on said casing; a sensor unit mounted on said housing, said sensor unit generating an electrical signal corresponding to position of said push piece in said casing; a converter circuit mounted on said housing and connected electrically to said sensor unit, said converter circuit converting said electrical signal into a digital reading of the predetermined torsion force limit; and a display unit mounted on said housing and connected electrically to said converter circuit, said display unit displaying said digital reading thereon.

2. The torsion wrench as claimed in claim 1, wherein:

said casing has an internally threaded nut mounted therein; and said push rod unit includes an externally threaded rod having said first end portion which extends nonrotatably and which is disposed axially and slidably in said handle member, and said second end portion which engages threadedly said nut in said casing and which is connected to said push piece.

3. The torsion wrench as claimed in claim 1, wherein:

said casing is formed with an axially extending slot, said push piece being aligned with said slot; and said sensor unit includes a variable resistor with a slider that extends through said slot in said casing and that is connected to said push piece.

4. The torsion wrench as claimed in claim 1, wherein:

said connecting end of said handle member extends into said housing and is provided with an annular flange that projects radially outward and that has a periphery formed with first teeth; and said torsion force detecting unit further includes a switch actuator which is mounted movably on said housing and which has an inner side formed with second teeth, said switch actuator being movable between a first position, wherein said second teeth engage said first teeth to arrest rotation of said handle member relative to said housing, and a second position, wherein said second teeth disengage said first teeth to permit rotation of said handle member.

* * * * *